No. 702,381. Patented June 10, 1902.
E. H. SEDDON.
HAND WHEEL.
(Application filed Jan. 7, 1902.)
(No Model.)
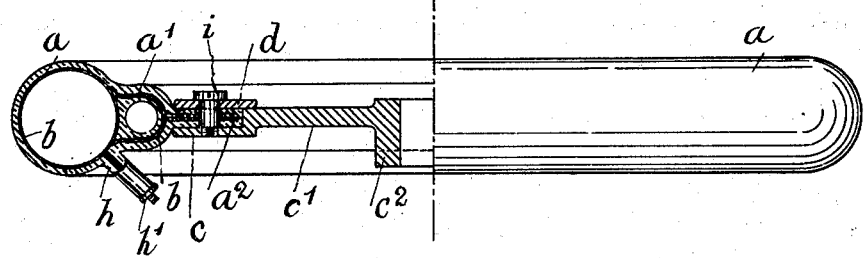
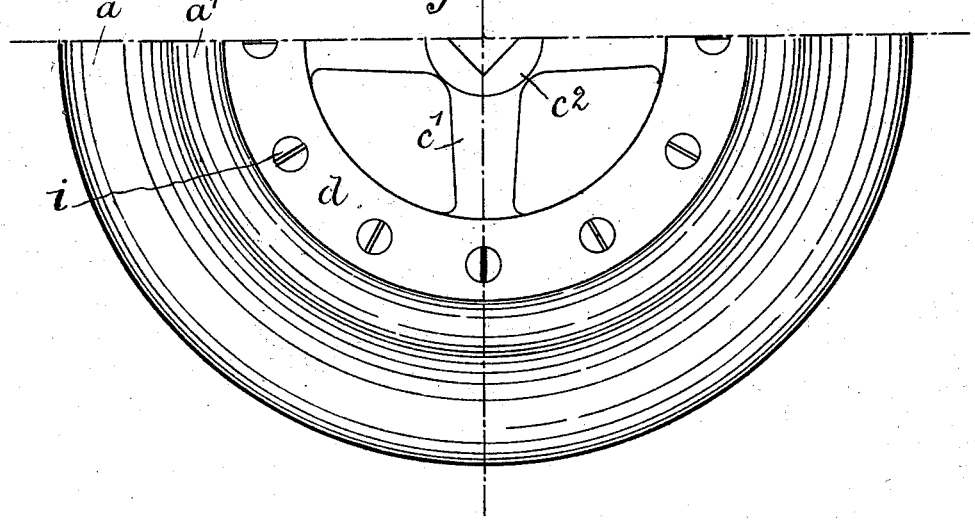
WITNESSES
INVENTOR
E. H. SEDDON.

UNITED STATES PATENT OFFICE.

EDWARD HENRY SEDDON, OF BROOKLANDS, ENGLAND.

HAND-WHEEL.

SPECIFICATION forming part of Letters Patent No. 702,381, dated June 10, 1902.

Application filed January 7, 1902. Serial No. 88,765. (No model.)

*To all whom it may concern:*

Be it known that I, EDWARD HENRY SEDDON, a subject of the King of Great Britain, residing at Woodbourne, Brooklands, in the county of Chester, England, have invented certain new and useful Improvements in Hand-Wheels, of which the following is a specification.

This invention relates to hand-wheels for turning spindles, such as the steering hand-wheels for motor-driven vehicles; and its object is to neutralize the fatiguing effect of the vibrations transmitted through the wheels as hitherto made to the hand of the driver. This object is attained by forming the rim of the hand-wheel of an elastic hollow annular fluid-tight tube provided with a non-return inlet-valve and filled with a suitable fluid under pressure, such as air, which tube is of such size and shape that when gripped by the hand the fingers do not come into contact with the rigid part of the wheel.

On the drawings appended hereunto, Figure 1 shows a side view, half in section, and Fig. 2 a half-plan, of a hand-wheel constructed in accordance with my invention.

Referring to Figs. 1 and 2, the rubber handle portion is pear-shaped in cross-section and consists of the annular tube $a$ of a given diameter and having an annular tubular extension $a'$ of less diameter formed on the inner periphery of the tube $a$.

$a^2$ is a flat annular extension to the extension $a'$.

The tube $a$ is formed of vulcanized india-rubber with canvas insertion $b$, the extensions $a'$ and $a^2$ likewise consisting of india-rubber, preferably with canvas insertion, as shown, or they may be made of india-rubber of a harder quality than the tube $a$.

The rim is fixed to the central part of the hand-wheel by means of the flat annular extension $a^2$. For this purpose the central part of the wheel is formed with a corresponding annular flat ring $c$, connected by arms $c'$ to the boss $c^2$, between which flat ring $c$ and a loose annular plate $d$, screwed or bolted to the ring $c$, the part $a^2$ of the rim is gripped. The part $a'$ of the rim may be cored out, as shown, or be solid and is provided for the purpose of preventing the fingers of the user from coming into contact with the metal rings $c$ and $d$.

The tube $a$ is preferably inflated with compressed air through the non-return or back-pressure valve. Preferably it is formed with a short india-rubber tube $h$, communicating with its interior, into which a non-return valve $h'$ of any usual kind is fixed.

It is of importance to notice that not only the tube $a$ but also the extensional tube $a'$ are beyond the metallic rim $c$ of the wheel, thereby enabling the grip of the hands upon soft warm rubber without touching the metal.

$i$ represents screws for fastening the annulus $d$ to the rim $c$.

I claim as my invention—

A hand-wheel consisting of the combination of an annular rubber tube of a given diameter and having an inflating-valve, an annular rubber extension of smaller diameter on the inner periphery of the first-named tube, the cross-section of the tube with its extension being approximately pear-shaped, and a metallic rim for said wheel, a plane annular extension $a^2$ on the smaller rubber extension fitting upon said rim, a metal annulus, and fastening devices for clamping said annulus and extension $a^2$, to said rim.

In witness whereof I have hereunto set my hand in the presence of two witnesses.

EDWARD HENRY SEDDON.

Witnesses:
 CARL BOLLÉ,
 ROBERT ARTHUR COLLINGE.